US009934730B2

(12) United States Patent
Choi

(10) Patent No.: US 9,934,730 B2
(45) Date of Patent: Apr. 3, 2018

(54) COMPUTING DEVICE AND IMAGE PROCESSING METHOD THEREOF

(71) Applicant: Samsung Electronics Co., Ltd., Suwon-si (KR)

(72) Inventor: Seonmyeong Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 197 days.

(21) Appl. No.: 14/724,153

(22) Filed: May 28, 2015

(65) Prior Publication Data

US 2016/0140906 A1 May 19, 2016

(30) Foreign Application Priority Data

Nov. 19, 2014 (KR) ........................ 10-2014-0161591
Jan. 20, 2015 (KR) ........................ 10-2015-0009501

(51) Int. Cl.
*G06F 3/038* (2013.01)
*G09G 3/34* (2006.01)

(52) U.S. Cl.
CPC ... *G09G 3/3406* (2013.01); *G09G 2320/0626* (2013.01); *G09G 2340/12* (2013.01); *G09G 2360/144* (2013.01)

(58) Field of Classification Search
CPC .................. G09G 3/3406; G09G 3/34; G09G 2320/0626; G09G 2360/144; G09G 2340/12
See application file for complete search history.

(56) References Cited

U.S. PATENT DOCUMENTS

| | | | | |
|---|---|---|---|---|
| 7,724,247 B2 | 5/2010 | Yamazaki et al. | | |
| 8,041,144 B2 | 10/2011 | Kim et al. | | |
| 8,704,803 B2 | 4/2014 | Koyama et al. | | |
| 2006/0279518 A1* | 12/2006 | Jang | G09G 3/3406 | 345/102 |
| 2008/0165116 A1* | 7/2008 | Herz | G09G 3/3406 | 345/102 |

(Continued)

FOREIGN PATENT DOCUMENTS

| | | |
|---|---|---|
| CN | 103969863 | 8/2014 |
| JP | 2010132800 | 6/2010 |
| JP | 2013250452 | 12/2013 |

(Continued)

*Primary Examiner* — Towfiq Elahi
(74) *Attorney, Agent, or Firm* — Cantor Colburn LLP

(57) ABSTRACT

A computing device includes an illumination sensor which detects external illumination, a processor which sets a screen design as a first screen design when a first condition is satisfied, wherein the first condition is satisfied when the external illumination is lower than a first threshold illumination value and a current illumination, which is currently stored, is higher than the first threshold illumination value, and sets the screen design as a second screen design when a second condition is satisfied, wherein the second condition is satisfied when the external illumination is higher than a second threshold illumination value higher than the first threshold illumination value and the current illumination is lower than the second threshold illumination value, and a display which displays an image on a screen thereof based on the set screen design.

20 Claims, 24 Drawing Sheets

(56) References Cited

U.S. PATENT DOCUMENTS

| | | | | |
|---|---|---|---|---|
| 2011/0216050 A1* | 9/2011 | Kim | G09G 3/20 | 345/207 |
| 2013/0069924 A1* | 3/2013 | Robinson | G09G 3/20 | 345/207 |

FOREIGN PATENT DOCUMENTS

| | | |
|---|---|---|
| JP | 2014084462 | 5/2014 |
| JP | 2014142585 | 8/2014 |
| JP | 2014153694 | 8/2014 |
| KR | 100735590 | 6/2007 |
| KR | 100763239 | 9/2007 |
| KR | 1020080068476 | 7/2008 |
| KR | 1020107025413 | 2/2011 |
| KR | 1020130121223 | 11/2013 |
| KR | 1020140094161 | 7/2014 |
| KR | 1020140095326 | 8/2014 |
| WO | 2009129911 | 10/2009 |
| WO | 2013182271 | 12/2013 |

* cited by examiner

COMPUTING DEVICE AND IMAGE PROCESSING METHOD THEREOF

CROSS-REFERENCE TO RELATED APPLICATIONS

This application claims priority to Korean Patent Application No. 10-2014-0161591 filed on Nov. 19, 2014 and Korean Patent Application No. 10-2015-0009501 filed on Jan. 20, 2015, and all the benefits accruing therefrom under 35 U.S.C. § 119, the contents of which in their entireties are herein incorporated by reference.

BACKGROUND

1. Field

Embodiments of the invention relate to a computing device, an image processing method thereof, and a storage medium storing instructions to implement the image processing method.

2. Description of the Related Art

A computing device, e.g., a mobile computing device, may be utilized in various environments, instead of being utilized only in a fixed place. Accordingly, a display device in the computing device may be desired to secure visibility in various environments such as an indoor environment in which lighting is preset, an outdoor environment in which solar light is directly irradiated, or a dark environment.

To secure the visibility, an image signal may be processed to increase luminance of a display device in a bright place and the image signal may be processed to decrease luminance of the display device in a dark place, based on ambient brightness.

SUMMARY

In an conventional computing device, where an image signal may be processed to increase luminance of a display device in a bright place and the image signal may be processed to decrease luminance of the display device in a dark place, based on ambient brightness to secure visibility, an issue that the visibility is degraded due to a phenomenon that an external object is reflected like a mirror and thereby displayed on a display device may not be effectively solved.

Embodiments provide a computing device with improved visibility, and an image processing method thereof.

An embodiment of a computing device includes a display, an illumination sensor, and a processor. In such an embodiment, the illumination sensor detects external illumination. In such an embodiment, the processor sets a screen design as a first screen design when a first condition is satisfied, where the first condition is satisfied when the external illumination is lower than a first threshold illumination value and a stored current illumination is higher than the first threshold illumination value, and sets the screen design as a second screen design when a second condition is satisfied, where the second condition is satisfied when the external illumination is higher than a second threshold illumination value higher than the first threshold illumination value and the current illumination is lower than the second threshold illumination value. In such an embodiment, the display displays an image on a screen thereof based on the set screen design.

In an embodiment, the processor may set the screen design as a third screen design when a third condition or a fourth condition is satisfied, where the third condition is satisfied when the external illumination is higher than a third threshold illumination value and lower than the second threshold illumination value and the current illumination is lower than the third threshold illumination value, and the fourth condition is satisfied when the external illumination is lower than a fourth threshold illumination value and higher than the first threshold illumination value and the current illumination is higher than the fourth threshold illumination value. In such an embodiment, the third threshold illumination value is higher than the first threshold illumination value, the fourth threshold illumination value is higher than the third threshold illumination value, and the second threshold illumination value is higher than the fourth threshold illumination value.

In an embodiment, the processor may maintain the screen design as it is when the external illumination and the current illumination do not satisfy the first condition, the second condition, the third condition and the fourth condition.

In an embodiment, the processor may store the external illumination as the current illumination and may detect the external illumination again through the illumination sensor after a predetermined period of time has elapsed.

In an embodiment, the second screen design may include a third screen design and a fourth screen design. In such an embodiment, the processor may set the screen design as the third screen design when the external illumination and the current illumination satisfy the second condition and a ratio a scarlet illumination to an entire illumination in the external illumination is greater than or equal to a threshold value, and may set the screen design as the fourth screen design when the external illumination and the current illumination satisfy the second condition and the ratio of the scarlet illumination to the entire illumination in the external illumination is less than the threshold value.

In an embodiment, each of the first screen design and the second screen design may include a text area and a background area. In such an embodiment, the text area may include a text to be displayed on the display, and the background area may include a background to be displayed on the display. In such an embodiment, the background area of the first screen design may be darker than the background area of the second screen design.

In an embodiment, an average lightness value of the background area of the first screen design may be less than an average lightness value of the background area of the second screen design.

In an embodiment, the average lightness value of the background area of the first screen design may be less than about 50%, and the average lightness value of the background area of the second screen design may be greater than or equal to about 50%.

In an embodiment, the text area of the first screen design may be brighter than the background area of the first screen design, and the text area of the second screen design may be darker than the background area of the second screen design.

In an embodiment, an average lightness value of the text area of the first screen design may be greater than an average lightness value of the background area of the first screen design, and an average lightness value of the text area of the second screen design may be less than an average lightness value of the background area of the second screen design.

In an embodiment, the computing device may further include an input device which provides an interface of adjusting a plurality of threshold illumination values including the first threshold illumination value and the second threshold illumination value.

In an embodiment, the computing device may further include an input device which provides an interface for selecting a single screen design from a plurality of screen designs including the first screen design and the second screen design, independently of the external illumination.

An embodiment of an image processing method of a computing device including a display includes: detecting external illumination; setting a screen design as a first screen design when the external illumination is lower than a first threshold illumination value and a current illumination, which is currently stored, is higher than the first threshold illumination value, and setting the screen design as a second screen design when the external illumination is higher than a second threshold illumination value higher than the first threshold illumination value and the current illumination is lower than the second threshold illumination value; and displaying an image on a screen of the display based on the set screen design.

In an embodiment, setting the external illumination may include setting the screen design as a third screen design, when the external illumination is higher than a third threshold illumination value and lower than the second threshold illumination value and the current illumination is lower than the third threshold illumination value or when the external illumination is lower than a fourth threshold illumination value and higher than the first threshold illumination value and the current illumination is higher than the fourth threshold illumination value.

In an embodiment, the image processing method may further include storing the external illumination as the current illumination, and repeating the detecting the external illumination, the setting the external illumination and the displaying the screen at predetermined time intervals.

In an embodiment, each of the first screen design and the second screen design may include a text area and a background area, the text area may include a text to be displayed on the display, and the background area may include a background to be displayed on the display. In such an embodiment, the background area of the first screen design may be darker than the background area of the second screen design.

In an embodiment, the text area of the first screen design may be brighter than the background area of the first screen design, and the text area of the second screen design may be darker than the background area of the second screen design.

In an embodiment, the image processing method may further include providing an interface of adjusting a plurality of threshold illumination values including the first threshold illumination value and the second threshold illumination value, and receiving an adjusted value of a threshold illumination value of the plurality of threshold illumination values through the interface.

In an embodiment, the image processing method may further include providing an interface for selecting a plurality of screen designs including the first screen design and the second screen design, and receiving a selection on any one of the plurality of screen designs through the interface.

An embodiment of a non-transitory computer-readable storage medium storing an instruction to implement an image processing method on a processor of a computing device including a display includes: detecting external illumination; setting a screen design as a first screen design when the external illumination is lower than a first threshold illumination value and a current illumination, which is currently stored, is higher than the first threshold illumination value, and setting the screen design as a second screen design when the external illumination is higher than a second threshold illumination value higher than the first threshold illumination value and the current illumination is lower than the second threshold illumination value; and displaying a screen image, on which the set screen design and an image are combined, on a display.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
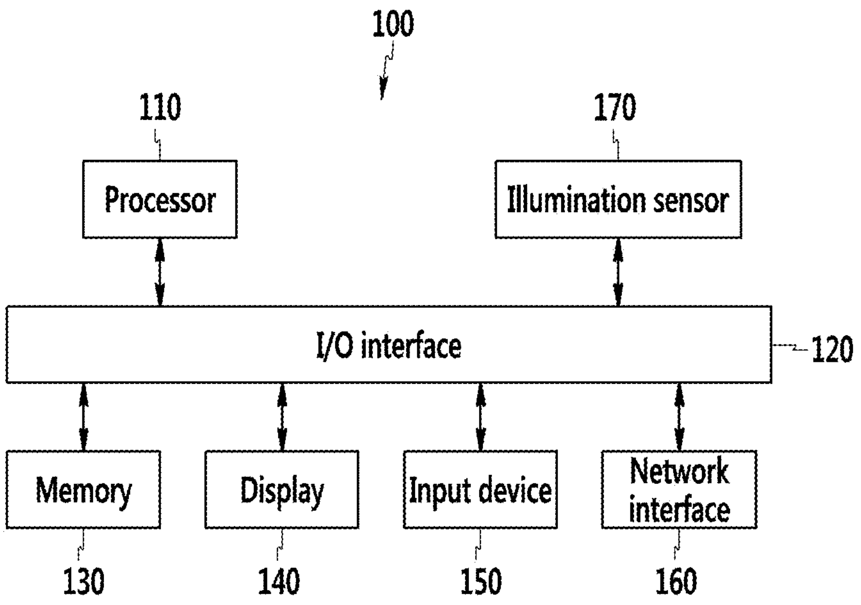
FIG. 1 is a block diagram illustrating an embodiment of a computing device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a block diagram illustrating an embodiment of a computing device according to the invention. In an embodiment, the computing device 100, as a device that includes a display device and may also be exposed to various environments, may be one of various types of devices. The various types of devices may include a mobile phone such as a smartphone, a tablet computer, a laptop computer, a smart watch, and a personal digital assistant ("FDA"), for example, but not being limited thereto.

In an embodiment, the computing device 100 includes a processor 110 connected to an input/output ("I/O") interface 120. In an embodiment, the processor 110 may provide a function of configuring various embodiments described in the following. In another embodiment, the processor 110 may execute an instruction for configuring various embodiments described in the following.

In an embodiment, the processor 110 may be a physical processor. The physical processor may include a general purpose processor and/or a special processor, for example, but not being limited thereto. The general purpose processor may include a complex instruction set computing ("CISC") microprocessor, a reduced instruction set computing ("RISC") microprocessor, or a very long instruction word ("VLIW") microprocessor, for example, but not being limited thereto. The special processor may include an application specific integrated circuit ("ASIC"), a field programmable gate array ("FPGA"), a digital signal processor, and a graphics processing unit ("GPU"), for example, but not being limited thereto.

In an embodiment, the computing device 100 further includes a memory 130, a display 140, an input device 150, and/or a network interface 160 connected to the I/O interface 120.

The memory 130 may include a volatile memory device, a nonvolatile memory device, and/or a secondary memory device as a computer-readable storage medium. The volatile memory device may include a random access memory ("RAM") type of memory such as a RAM, a static RAM ("SRAM"), a synchronous dynamic RAM ("SDRAM)", or a Rambus dynamic RAM ("RDRAM"), for example, but not being limited thereto. The nonvolatile memory device may include a read only memory ("ROM") type of memory or flash memory such as a ROM, a programmable ROM ("PROM"), an erasable PROM ("EPROM"), or an electrically erasable ROM ("EEPROM"), for example, but not being limited thereto. The secondary memory device may be a magnetic or optic disk type of memory, for example, but not being limited thereto.

The memory 130 may store an instruction and/or data to configure various embodiments described herein, and the instruction may be executed by the processor 110. In an embodiment, when the instruction is stored in the secondary memory device in the memory 130, the instruction may be loaded to the volatile or the nonvolatile memory and thereby be stored therein to be executed by the processor 110. In an embodiment, an instruction and/or data transferred from a computer-readable storage medium, such as a server, over a wireless or wired network may be stored in the memory 130 through the network interface 160.

The display 140 displays an image and includes a display panel. The display panel may include a liquid crystal display ("LCD") panel or an organic light emitting display ("OLED") panel, for example, but not being limited thereto.

The input device 150 may include a keyboard or a keypad, a pointing device, and/or a touch panel, for example, but not being limited thereto. The touch panel may be disposed on, e.g., disposed to cover or overlap, the display 140.

In an embodiment, the network interface 160 communicates with another device over a network and may provide a wired and/or wireless communication interface.

In such an embodiment, the computing device 100 further includes an illumination sensor 170 connected to the I/O interface 120. The illumination sensor 170 may include a photosensor or a photodetector, for example, but not being limited thereto. The illumination sensor 170 detects the quantity of ambient light, e.g., illumination of the ambient light, and transfers an illumination detection signal corresponding to the detected illumination to the processor 110. In such an embodiment, the processor 110 executes the instruction stored in the memory 130 and displays an image corresponding to the detected illumination on the display 140.

Figure 2:
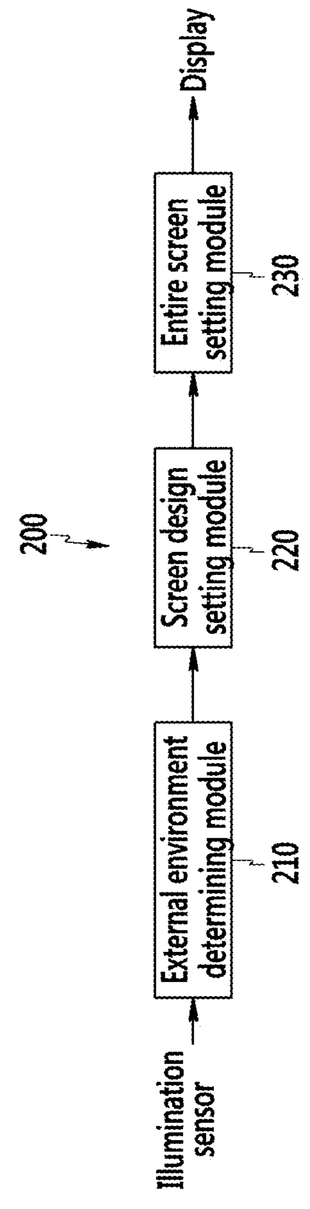
FIG. 2 is a block diagram illustrating an embodiment of an image processing module according to the invention.

FIG. 2 is a block diagram illustrating an embodiment of an image processing module according to the invention.

Referring to FIG. 2, an embodiment of the image processing module 200 includes an external environment determining module 210, a screen design setting module 220, and an entire screen setting module 230.

In an embodiment, the external environment determining module 210 determines an external environment based on intensity of external light, that is, external illumination, detected at the illumination sensor 170 of FIG. 1. The external environment determining module 210 may determine the external environment based on a currently stored external illumination and the external illumination detected at the illumination sensor 170. Herein, the currently stored external illumination may be referred to as a current illumination, a current external illumination or a stored illumination.

In an embodiment, the external environment determining module 210 may determine the external environment as any one of a low illumination environment (that is, a dark environment), a high illumination environment (that is, a bright environment), and a general illumination environment. In such an embodiment, the external environment determining module 210 may use a threshold value (e.g., a first threshold illumination value) for determining the low illumination environment, a threshold value (e.g., a second threshold illumination value) for determining the high illumination environment, and a threshold value (e.g., third and fourth threshold illumination values) for determining the general illumination environment. In such an embodiment, the third threshold illumination value is set to be higher than the first threshold illumination value, the fourth threshold illumination value is set to be higher than the third threshold illumination value, and the second threshold illumination value is set to be higher than the fourth threshold illumination value.

In an embodiment, when the detected external illumination is lower than the first threshold illumination value, the external environment determining module 210 determines that the external environment is changed to the low illumination environment when the current external illumination is higher than the first threshold illumination value. When the detected external illumination is lower than the first threshold illumination value and the current external illumination is also lower than the first threshold illumination value, it is a state in which the current external environment is already set to the low illumination environment and thus the external environment determining module 210 maintains the current external environment as it is.

In such an embodiment, when the detected external illumination is higher than the second threshold illumination value, the external environment determining module 210 determines that the external environment is changed to the high illumination environment when the current external illumination is lower than the second threshold illumination value. When the detected external illumination is higher than the second threshold illumination value and the current external illumination is also higher than the second threshold illumination value, it is a state in which the current external environment is already set to the high illumination environment and thus the external environment determining module 210 maintains the current external environment as it is.

In such an embodiment, when the detected external illumination is between the first threshold illumination value and the third threshold illumination value, the external environment determining module 210 determines that the external environment is changed to the general illumination environment when the current external illumination is higher than the fourth threshold illumination value. When the detected external illumination is between the first threshold illumination value and the third threshold illumination value and the current external illumination is lower than the fourth threshold illumination value, it is a state in which the current external environment is already set to the low illumination environment or the general illumination environment and thus the external environment determining module 210 maintains the current external environment as it is.

In such an embodiment, when the detected external illumination is between the third threshold illumination value and the fourth threshold illumination value, the external environment determining module 210 determines that the external environment is changed to the general illumination environment when the current external illumination is lower than the third threshold illumination value or higher than the fourth threshold illumination value. When the detected external illumination is between the third threshold illumination value and the fourth threshold illumination value and the current external illumination is between the third threshold illumination value and the fourth threshold illumination value, it is a state in which the current external environment is already set to the general illumination environment and thus the external environment determining module 210 maintains the current external environment as it is.

In such an embodiment, when the detected external illumination is between the fourth threshold illumination value and the second threshold illumination value, the external environment determining module 210 determines that the external environment is changed to the general illumination environment when the current external illumination is lower than the third threshold illumination value. When the detected external illumination is between the fourth threshold illumination value and the second threshold illumination value and the current external illumination is higher than the third threshold illumination value, it is a state in which the current external environment is already set to the high illumination environment or the general illumination environment and thus the external environment determining module 210 maintains the current external environment as it is.

In an embodiment, at an initial operation of the computing device 100, the current external illumination may be set to a value corresponding to the general illumination environment, for example, a value between the third threshold illumination value and the fourth threshold illumination value.

In an embodiment, the first threshold illumination value, the second threshold illumination value, the third threshold illumination value and the fourth threshold illumination value may be adjusted by a user of the computing device 100 with an initial value.

In an embodiment, the screen design setting module 220 changes or maintains a screen design displayed on the display 140 of FIG. 1 based on a result of determining the external environment. In an embodiment, when the current environment is determined to be changed to the low illumination environment, the screen design setting module 220 reads a screen design for the low illumination environment corresponding to the screen design displayed on the display 140 from the memory 130 of FIG. 1. When the current environment is determined to be changed to the high illumination environment, the screen design setting module 220 reads a screen design for the high illumination environment corresponding to the screen design displayed on the display 140 from the memory 130. When the current environment is determined to be changed to the general illumination environment, the screen design setting module 220 reads a screen design for the general illumination environment corresponding to the screen design displayed on the display 140 from the memory 130. When illumination of the current environment is determined to not be changed, the screen design setting module 220 maintains the screen design displayed on the display 140 as it is.

In an embodiment, the screen design for the low illumination environment may be a dark screen design, and the screen design for the high illumination environment may be a bright screen design. The screen design for the general illumination environment may be a screen design set by the computing device 100, an operating system ("OS") of the computing device 100, or a user of the computing device 100.

The entire screen setting module 230 applies the screen design read from the memory 130 to another image to be displayed on the display 140.

Accordingly, the display 140 displays an image on a screen, which is applied to the screen design determined based on the external illumination.

Then, when the external environment is bright, an image modified according to a bright screen design is displayed on the display 140. When the external environment is dark, an image modified according to a dark screen design is displayed on the display 140. In such an embodiment, a phenomenon that an external object is reflected like a mirror and thereby displayed on the display 140 (e.g., a screen of the display 140) decreases when an image is displayed according to different screen design based on different external environment, and thus the visibility may be improved.

In an embodiment, at least some modules of the image processing module 200 may be defined by instructions processed by the processor 110. In an alternative embodiment, at least some modules of the image processing module 200 may be implemented by functions of the processor 110. In still an alternative embodiment, at least some modules of the image processing module 200 may be implemented by a combination of a function of the processor 110 and an instruction.

Figure 3:
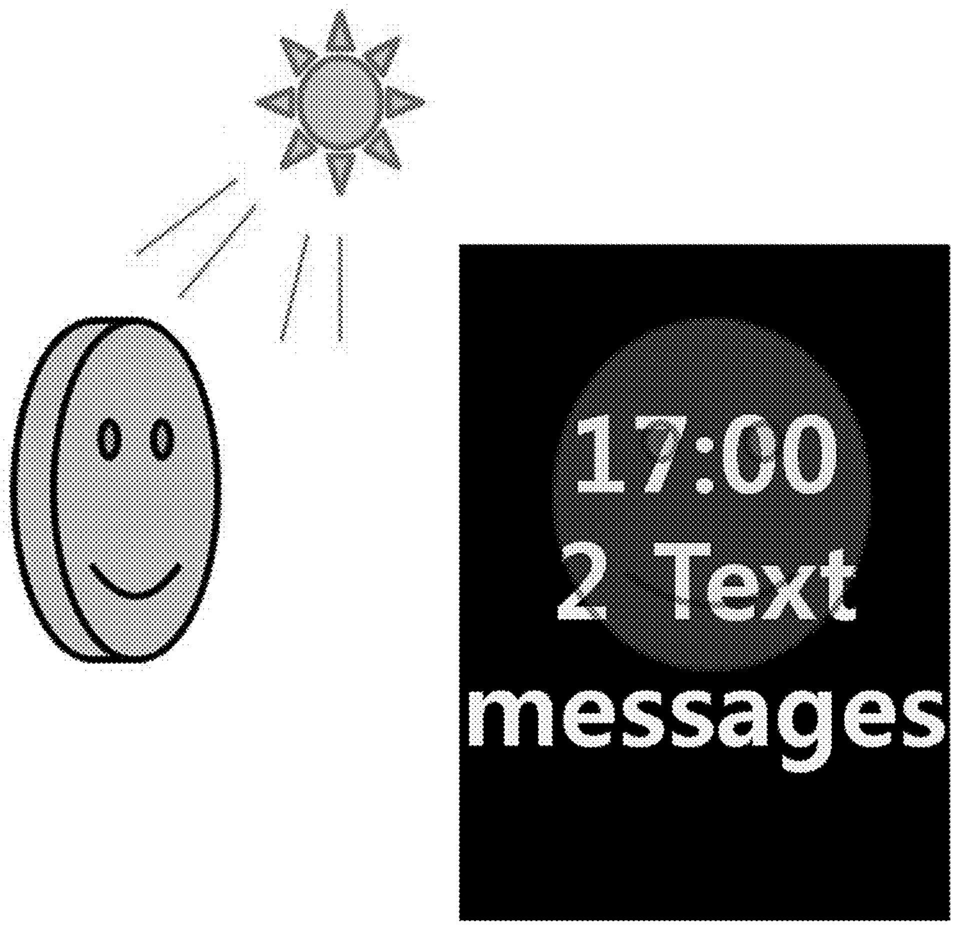
FIG. 3 illustrates an example of a mirror phenomenon in a conventional computing device.
Figure 4A:
FIG. 4A and FIG. 4B illustrate examples of a mirror phenomenon in a conventional computing device.
Figure 4B:
Figure 5A:
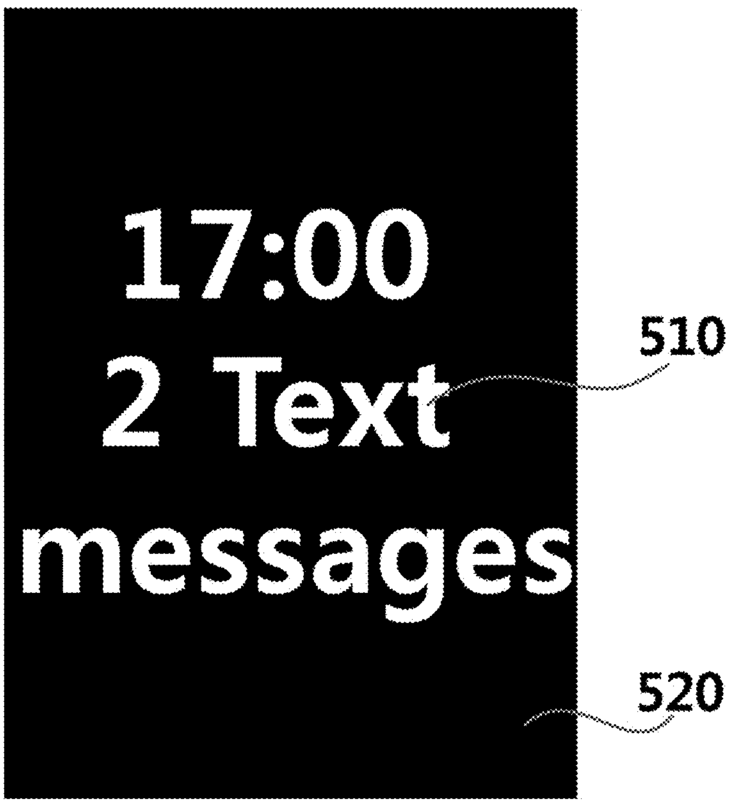
FIG. 5A and FIG. 5B illustrate examples of a screen design by an embodiment of an image processing method according to the invention.
Figure 5B:
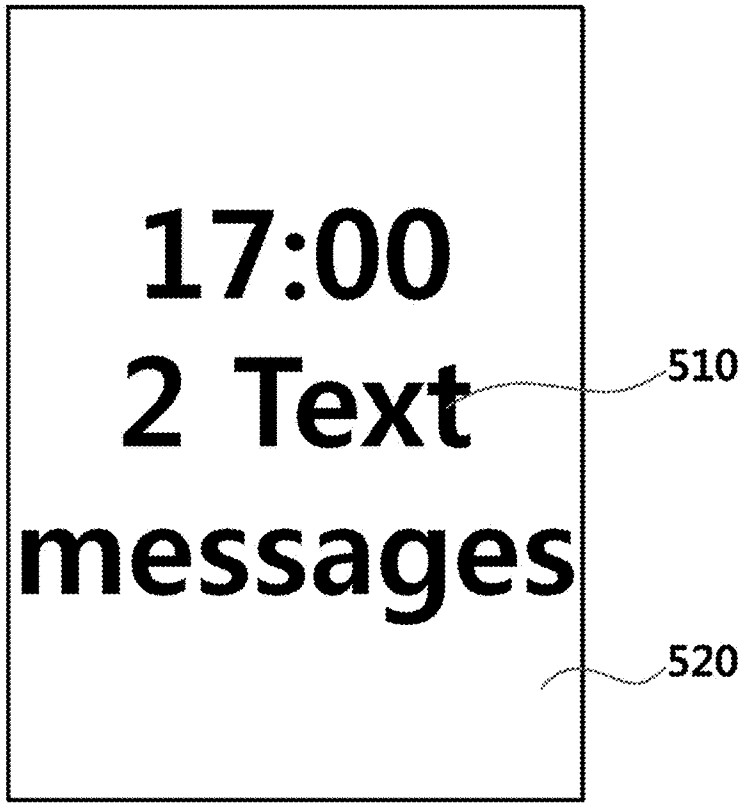
Figure 6A:
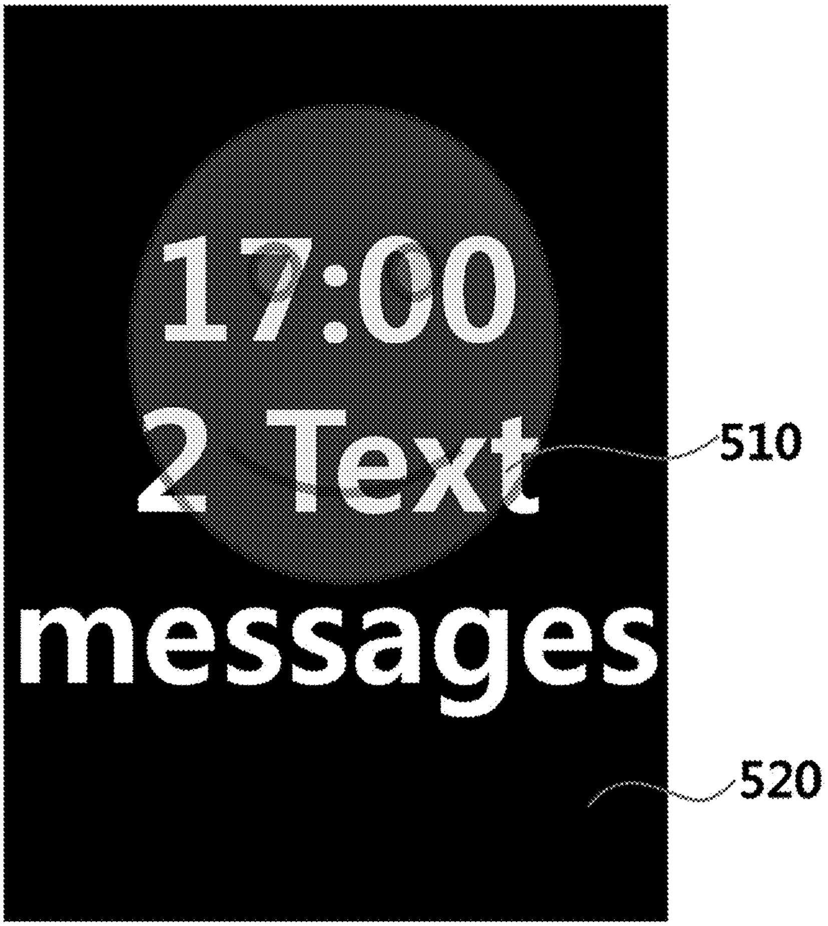
FIG. 6A and FIG. 6B illustrate examples of a mirror phenomenon in the screen design by an embodiment of an image processing method of FIG. 5A and FIG. 5B.
Figure 6B:
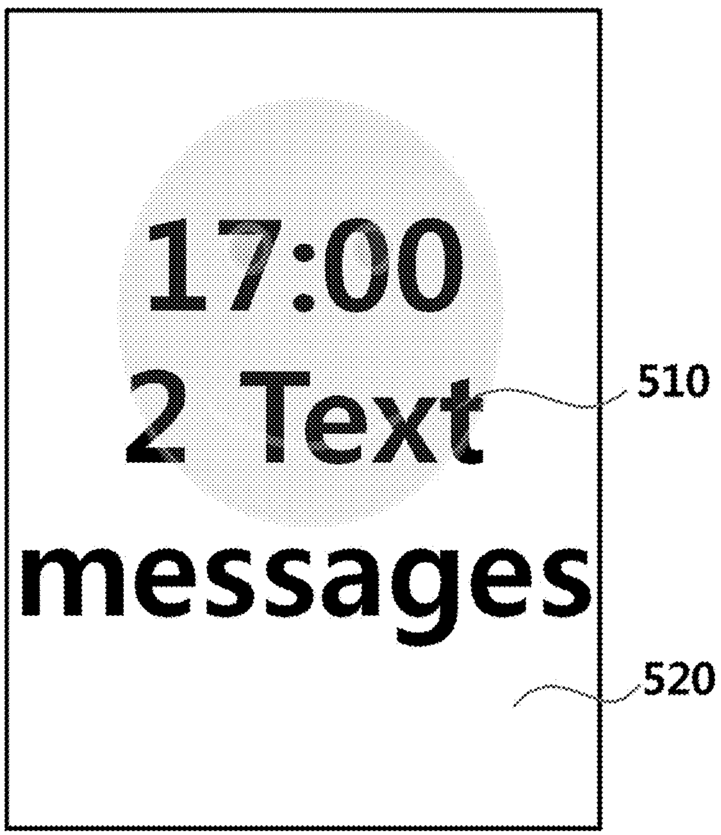

FIG. 3 illustrates an example of a mirror phenomenon in a conventional computing device, FIG. 4A and FIG. 4B illustrate examples of a mirror phenomenon in a conventional computing device, FIGS. 5A and 5B illustrate examples of a screen design by an image processing method according to an embodiment, and FIGS. 6A and 6B illustrate examples of a mirror phenomenon in the screen design by an embodiment of an image processing method of FIG. 5A and FIG. 5B. FIG. 7A, FIG. 7B, FIG. 8A, FIG. 8B, FIG. 9A, and FIG. 9B illustrate examples of a screen design by various embodiments of an image processing method according to the invention. Here, FIG. 4A, FIG. 5A, FIG. 6A, FIG. 7A, FIG. 8A, and FIG. 9A illustrate examples of a screen design in a dark environment, and FIG. 4B FIG. 5B, FIG. 6B, FIG. 7B, FIG. 8B, and FIG. 9B illustrate examples of a screen design in a bright environment.

In a conventional computing device illustrated in FIG. 3, when a user verifies a text of the computing device in a bright environment, a face of the user may be reflected like a mirror and thereby displayed on a display screen of the computing device such that the visibility of a text may be degraded.

Accordingly, in a conventional display, a method of increasing luminance of a screen displayed on the display of the computing device in the bright environment and decreasing the luminance of the screen displayed on the display of the computing device in the dark environment may be used to increase the visibility. However, even though such a method is used, the luminance of the screen displayed on the display may decrease in the dark environment as illustrated in FIG. 4A, and the luminance of the screen displayed on the display may increase in the bright environment as illustrated in FIG. 4B, and the face of the user may still be reflected like a mirror and thereby displayed on the display screen.

Referring to FIG. 5A and FIG. 5B, in an embodiment of the invention, a screen design may include at least two areas. The two areas include a text area 510 and a background area 520, wherein text area 510 is an area including a text and a line, and the background area 520 is an area including a background of a screen. As illustrated in FIG. 5A, a screen design having the text area 510 processed to be bright and the background area 520 processed to be dark is used in a dark environment. As illustrated in FIG. 5B, a screen design having the text area 510 processed to be dark and the background area 520 processed to be bright is used in a bright environment. In an embodiment, the background area 520 processed to be bright may be brighter than the background area 520 processed to be dark.

Accordingly, when a current environment is determined to be changed to a low illumination environment, a screen design to be displayed on the display 140 of FIG. 1 may be changed to the screen design as shown in FIG. 5A. When the current environment is determined to be changed to a high illumination environment, the screen design to be displayed on the display 140 may be changed to the screen design as shown in FIG. 5B. When the current environment is determined to be changed to a general illumination environment, the screen design to be displayed on the display 140 may be changed to a general screen design. When an illumination of the external environment is determined to not be changed, the screen design displayed on the display 140 is maintained. Herein, "screen design to be displayed on the display" may refer to a screen design based on which an image is displayed.

In an embodiment, brightness and darkness of the text area 510 and the background area 520 may be determined based on lightness. In an embodiment, when an average lightness value of the background area 520 may be greater than or equal to a predetermined lightness threshold value, the background area 520 may be processed to be bright. In such an embodiment, when the average lightness value of the background area 520 may be less than the lightness threshold value, the background area 520 is processed to be dark. In an embodiment, the lightness threshold value may be about 50%. In another embodiment, a lightness value may be a lightness value when a red, green and blue ("RGB") color expression value of an image signal is converted to Hue, Saturation, and Lightness ("HSL") expression. In another embodiment, an average lightness value of the background area 520 processed to be dark may be less than an average lightness value of the background area 520 processed to be bright.

In an embodiment, when an average lightness value of the text area 510 is less than an average lightness value of the background area 520, the text area 510 may be processed to be dark. In such an embodiment, when the average lightness value of the text area 510 is higher than the average lightness value of the background area 520, the text area 510 may be processed to be bright.

In an embodiment, the screen design setting module 220 of FIG. 2 may adjust the lightness value of the screen design based on the current environment in real time. In one embodiment, for example, when the current environment is changed to the dark environment, the screen design setting module 220 may increase the average lightness value of the background area 520 to be greater than or equal to the lightness threshold value and may adjust the average lightness value of the text area 510 to be lower than the average lightness value of the background area 520. When the current environment is changed to the bright environment, the screen design setting module 220 may decrease the average lightness value of the background area 520 to be less than the lightness threshold value, and may adjust the average lightness value of the text area 510 to be higher than the average lightness value of the background area 520.

In an alternative embodiment, the screen design may be stored in the memory 130 of FIG. 1. Then, the screen design setting module 220 of FIG. 2 may extract the screen design for the dark environment from the memory 130 in the dark environment, and may extract the screen design for the bright environment from the memory 130 in the bright environment. Accordingly, in such an embodiment, a lightness value of the screen design may not be adjusted in real time, such that processing load of the processor 110 and power consumption may be reduced.

When processing the text area 510 and the background area 520 as illustrated in FIG. 5A and FIG. 5B, a text and a line may be processed to be bright in the dark environment and a background may reprocessed to be dark as illustrated in FIG. 6A. Accordingly, the entire brightness may become dark and the quantity of light reflected toward the face may decrease, thereby decreasing a mirror phenomenon occurring in the display 140. Also, the text and the line may be processed to be relatively bright compared to the background and thus the text and the line may appear clear due to a lightness difference. As illustrated in FIG. 6B, in the bright environment, the background may be processed to be bright, thereby decreasing the mirror phenomenon. Also, the text and the line may be processed to be relatively dark compared to the background and thus the text and the line may appear clear due to a lightness difference.

In an embodiment, the screen design may further include an icon.

Figure 7A:
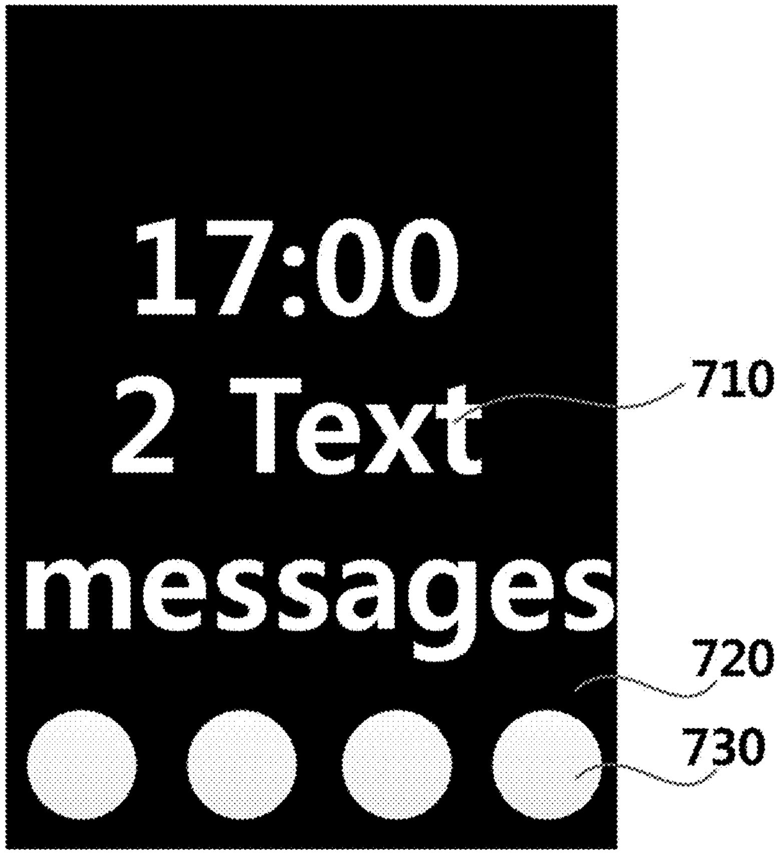
FIG. 7A, FIG. 7B, FIG. 8A, FIG. 8B, FIG. 9A, and FIG. 9B illustrate examples of a screen design by various embodiments of an image processing method according to the invention.
Figure 7B:
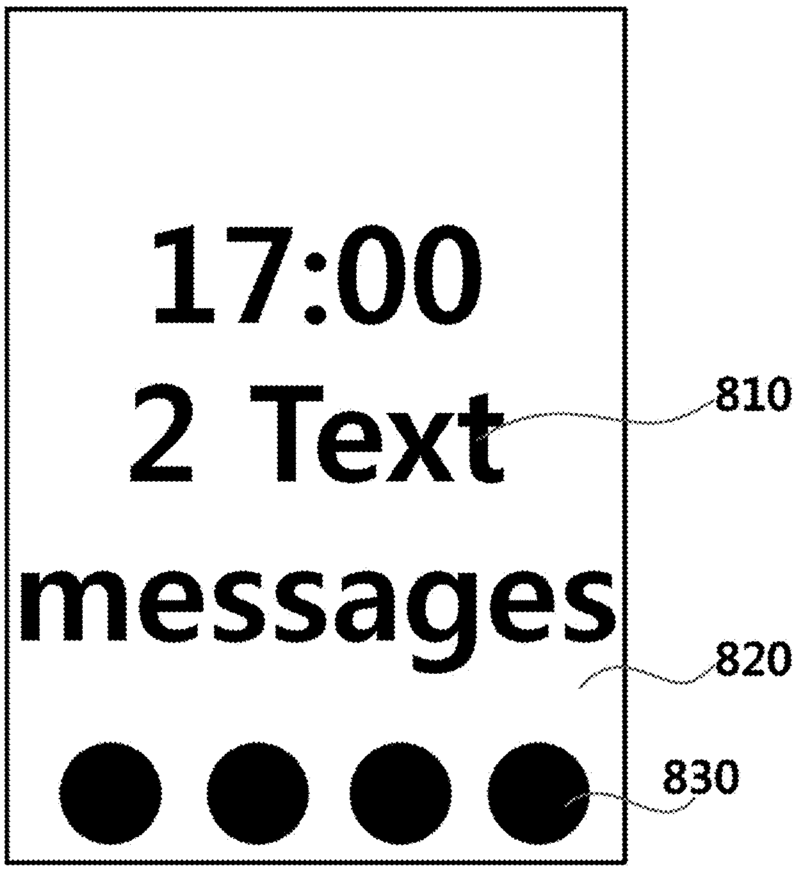

According to an embodiment, a text area 710 includes a text, a line, and an icon 730, and a background area 720 includes a background of a screen. Accordingly, as illustrated in FIG. 7A, in a dark environment, the text area 710 including the text, the line, and the icon 730 is processed to be bright and the background area 720 is processed to be dark. As illustrated in FIG. 7B, in a bright environment, the text area 710 is processed to be dark and the background area 720 is processed to be bright.

Figure 8A:
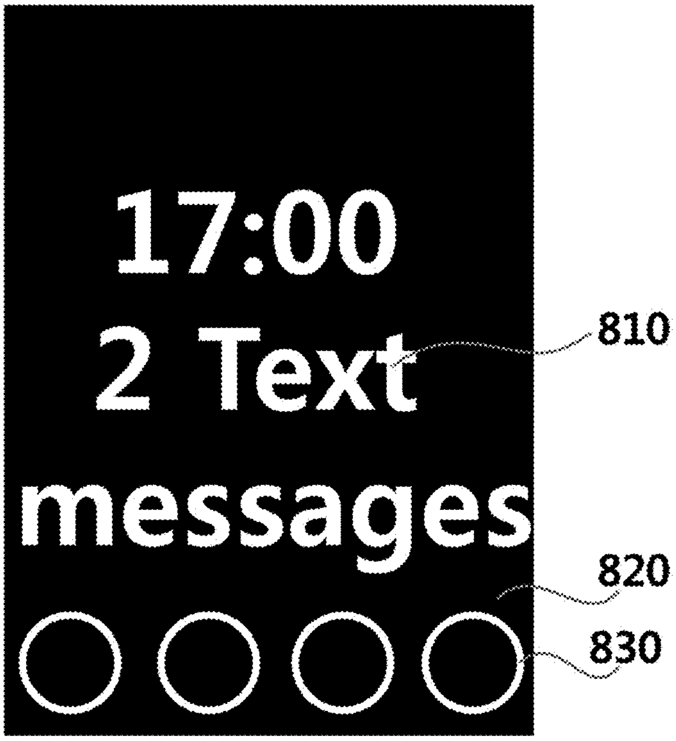
Figure 8B:
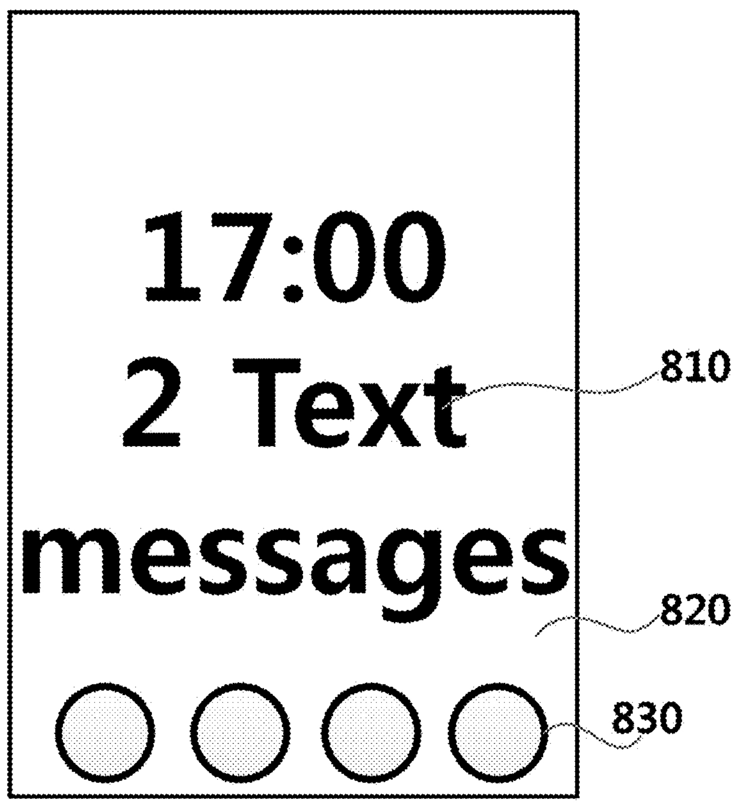

According to an alternative embodiment, a text area 810 includes a text and a line, and a background area 820 includes a background of a screen and an icon 830. Accordingly, as illustrated in FIG. 8A, in a dark environment, the text area 810 including the text and the line is processed to be bright and the background area 820 including the background and the icon 830 is processed to be dark. As illustrated in FIG. 8B, in a bright environment, the text area 810 is processed to be dark and the background area 820 is processed to be bright.

Figure 9A:
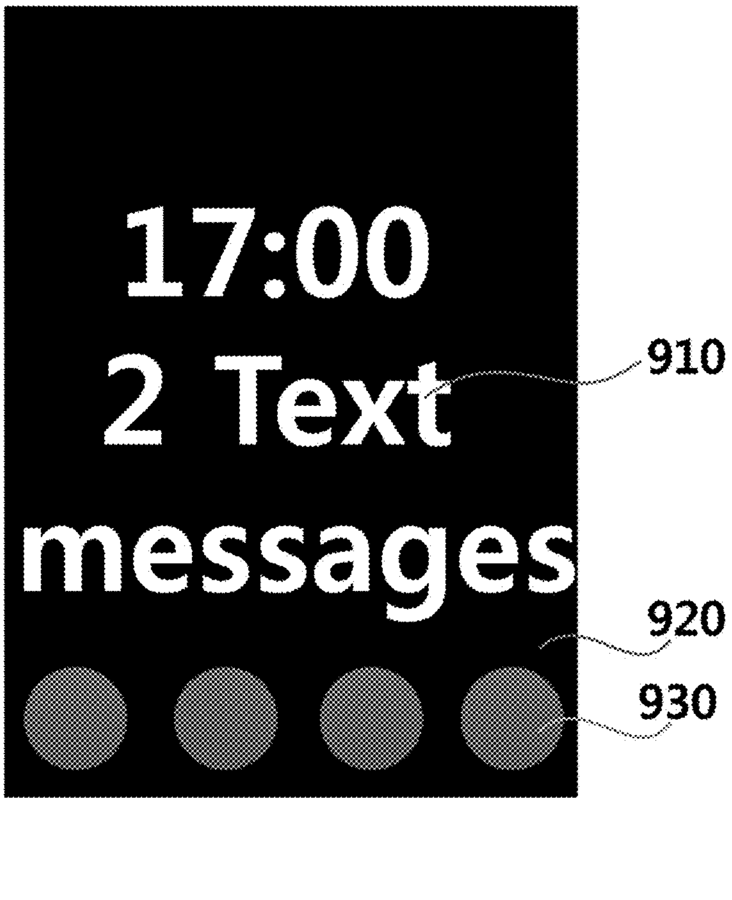
Figure 9B:
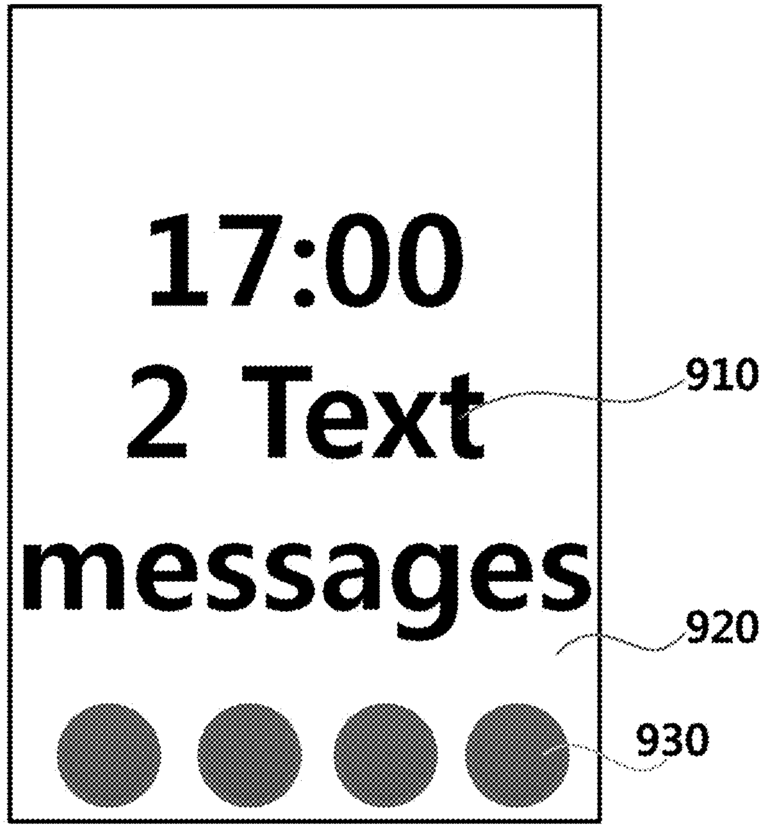

According to another alternative embodiment, a screen design includes a text area 910 including a text and a line, a background area 920 including a background, and an icon area 930 including an icon. As illustrated in FIG. 9A, in a dark environment, the text area 910 including the text and the line is processed to be bright, the background area 920 is processed to be dark, and the icon area 930 maintains an original lightness. As illustrated in FIG. 9B, in a bright environment, the text area 910 is processed to be dark, the background area 920 is processed to be bright, and the icon area 930 maintains an original lightness. In an embodiment, the icon area 930 may have substantially the same lightness in the bright environment and the dark environment.

Figure 10:
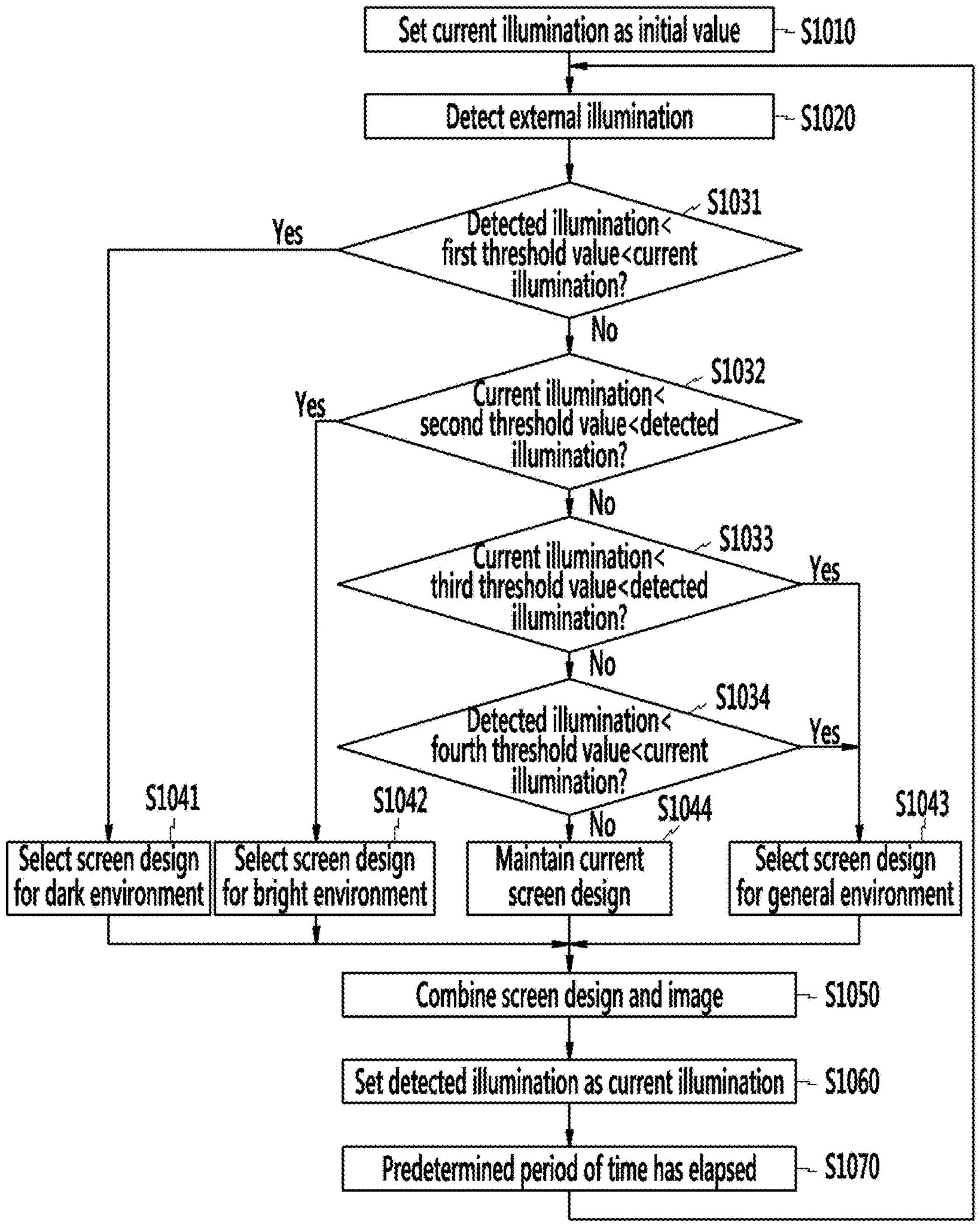
FIG. 10 is a flowchart illustrating an embodiment of an image processing method according to the invention.

FIG. 10 is a flowchart illustrating an embodiment of an image processing method according to the invention.

Referring to FIG. 10, a current external illumination or a current illumination, which is a detected and currently stored, is set as an initial value (S1010). In one embodiment, for example, at an initial operation of a computing device, the image processing module 200 of FIG. 2 sets the current external illumination as the initial value. The initial value is a value corresponding to a general illumination environment, and may be a value between a third threshold illumination value and a fourth threshold illumination value, as described above. In one embodiment, for example, the initial value may be set to about 50%.

Next, an illumination of the external environment is detected (S1020). In one embodiment, for example, the illumination sensor 170 of FIG. 1 detects an illumination of the external environment. In an embodiment, the detected external illumination is compared with the current external illumination and a threshold illumination value (S1031, S1032, S1033, and S1034). In one embodiment, for example, the external environment determining module 210 of the image processing module 200 compares the detected external illumination with the current external illumination and the threshold illumination value.

When the detected external illumination is lower than a first threshold illumination value and the current external illumination is higher than the first threshold illumination value (Yes in S1031), a screen design for a dark environment is selected (S1041). In one embodiment, for example, when the detected external illumination is lower than a first threshold illumination value and the current external illumination is higher than the first threshold illumination value, the external environment determining module 210 determines that the external environment is changed to a low illumination environment, that is, a dark environment, and the screen design setting module 220 sets a screen design to be displayed on the display 140 of FIG. 1 to the screen design for the low illumination environment. When the detected external illumination is higher than a second threshold illumination value and the current external illumination is lower than the second threshold illumination value (Yes in S1032), a screen design for a bright environment is selected (S1042). In one embodiment, for example, when the detected external illumination is higher than a second threshold illumination value and the current external illumination is lower than the second threshold illumination value, the external environment determining module 210 determines that the external environment is changed to a high illumination environment, that is, the bright environment, and the screen design setting module 220 sets the screen design to be displayed on the display 140 to the screen design for the high illumination environment.

In such an embodiment, when the detected external illumination is higher than the third threshold illumination value and the current external illumination is lower than the third threshold illumination value (Yes in S1033), or when the detected external illumination is lower than the fourth threshold illumination value and the current external illumination is higher than the fourth threshold illumination value (Yes in S1034), a screen design for a general environment is selected (S1043). In one embodiment, for example, when the detected external illumination is higher than the third threshold illumination value and the current external illumination is lower than the third threshold illumination value, or when the detected external illumination is lower than the fourth threshold illumination value and the current external illumination is higher than the fourth threshold illumination value, the external environment determining module 210 determines that the external environment is changed to a general illumination environment and the screen design setting module 220 sets a screen design to be displayed on the display 140 to a screen design for the general illumination environment. However, as described above in operations S1031 and S1032, when the detected external illumination is lower than the second threshold illumination value in operation S1033 (No in S1033) and when the detected external illumination is higher than the first threshold illumination value in operation S1034 (No in S1034), the screen design is set to the screen design for the general illumination environment (S1043).

In such an embodiment, when the current external illumination and the detected external illumination do not satisfy all of the cases of operations S1031, S1032, S1033 and S1034 (No in S1031, S1032, S1033 and S1034), the current screen design is maintained as it is (S1044). In one embodiment, for example, when the current external illumination and the detected external illumination do not satisfy all of the cases of operations S1031, S1032, S1033 and S1034, the external environment determining module 210 determines that the external environment is not changed and the screen design setting module 220 maintains the screen design to be displayed on the display 140 as it is, that is, determined the screen design as the current screen design.

In such an embodiment, the screen design and an image are combined (S1050). In one embodiment, for example, the entire screen setting module 230 combines the screen design set in operation S1041, S1042, S1043, or S1044 and another image to be displayed on the display 140. Accordingly, the display 140 displays the combined image.

In such an embodiment, the detected external illumination is set as the current external illumination (S1060), and the operation of S1020 may be repeatedly performed after a predetermined period of time has elapsed (S1070). In one embodiment, for example, to periodically determine the external environment, the image processing module 200 may set the detected external illumination as the current external illumination and may perform a procedure after operation S1020 again after a predetermined period of time has elapsed.

Figure 11A:
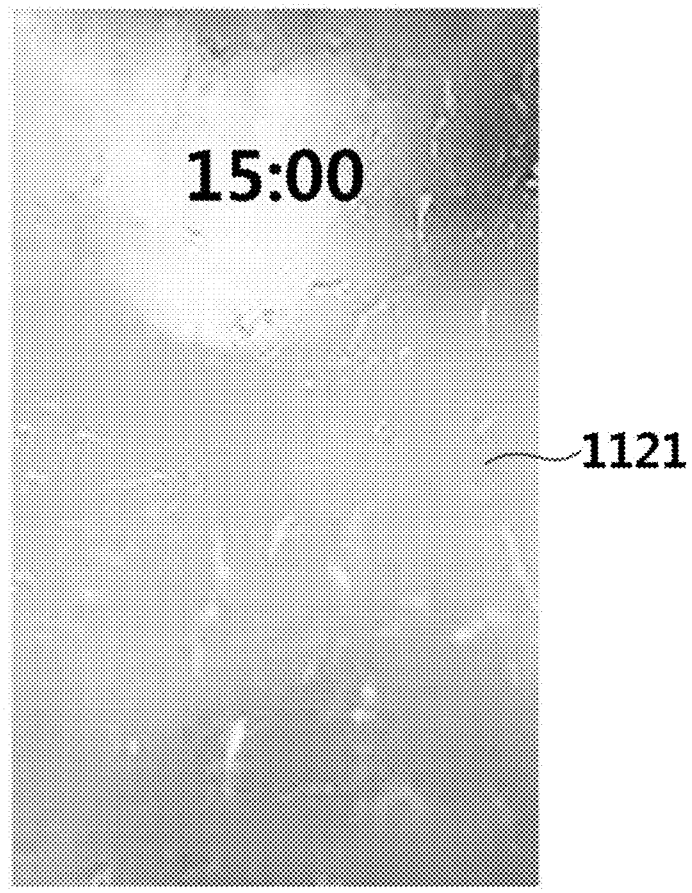
FIG. 11A and FIG. 11B illustrate examples of a screen design in an image processing method according to the invention.
Figure 11B:
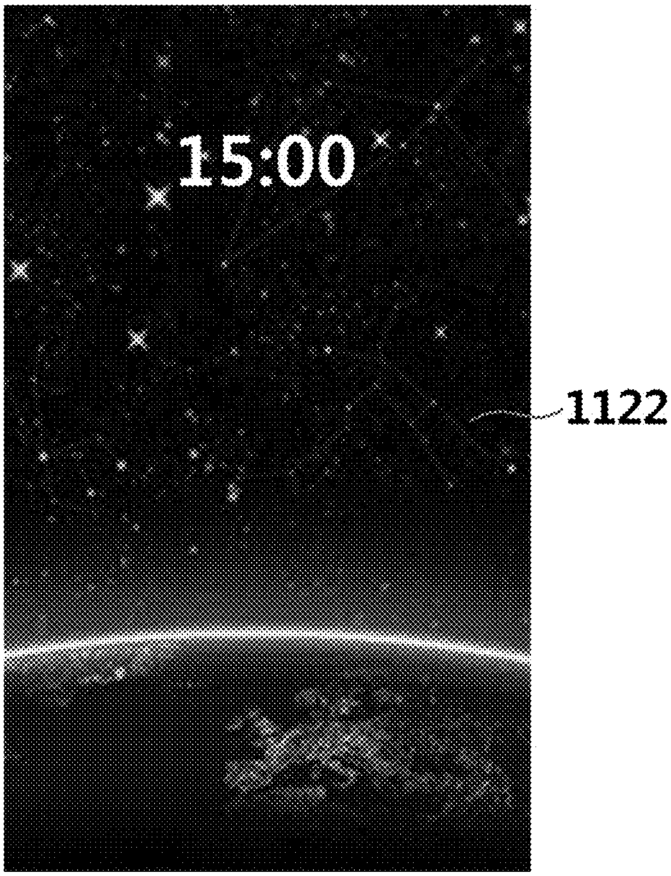

FIG. 11A and FIG. 11B illustrate examples of a screen design in an alternative embodiment of an image processing method according to the invention. FIG. 11A illustrates a screen design in a bright environment, and FIG. 11B illustrates a screen design in a dark environment.

Referring to FIG. 11A and FIG. 11B, in an embodiment, the screen design setting module 220 of FIG. 2 may also replace an image used for a background of a background area with another image, instead of changing only a lightness of the background area on the screen design based on an illumination of an external environment. A bright background image illustrated in FIG. 11A may be used as a background 1121 of the screen design in the bright environment, and a dark background image illustrated in FIG. 11B may be used as a background 1122 of the screen design in the dark environment.

According to an embodiment, the external environment determining module 210 of FIG. 2 may classify the external environment into a plurality of environments based on illumination for each wavelength. In an embodiment, the external environment determining module 210 may classify a bright environment (a high illumination environment) into a plurality of environments based on illumination for each wavelength. In one embodiment, for example, the external environment determining module 210 may classify the bright environment as an incandescent lamp environment and a non-incandescent lamp environment. The non-incandescent lamp environment may be a solar light environment or a florescent lamp environment. In an embodiment, the external environment determining module 210 may classify the external environment into the dark environment, the general illumination environment, the incandescent lamp environment, and the non-incandescent lamp environment. In such an embodiment, the external environment determining module 210 measures a scarlet illumination ratio with respect to an entire illumination of the external environment, and determines, as the incandescent lamp environment when the scarlet illumination ratio is greater than or equal to a threshold ratio. In an embodiment, when the external environment is a bright environment, the external environment determining module 210 may determine, as the incandescent lamp environment, a case in which the scarlet illumination ratio is greater than or equal to the threshold value. Then, the screen design setting module 220 sets a screen design for the incandescent lamp environment as the screen design to be displayed on the display 140 instead of setting the screen design for the bright environment (the high illumination environment).

Figure 12:
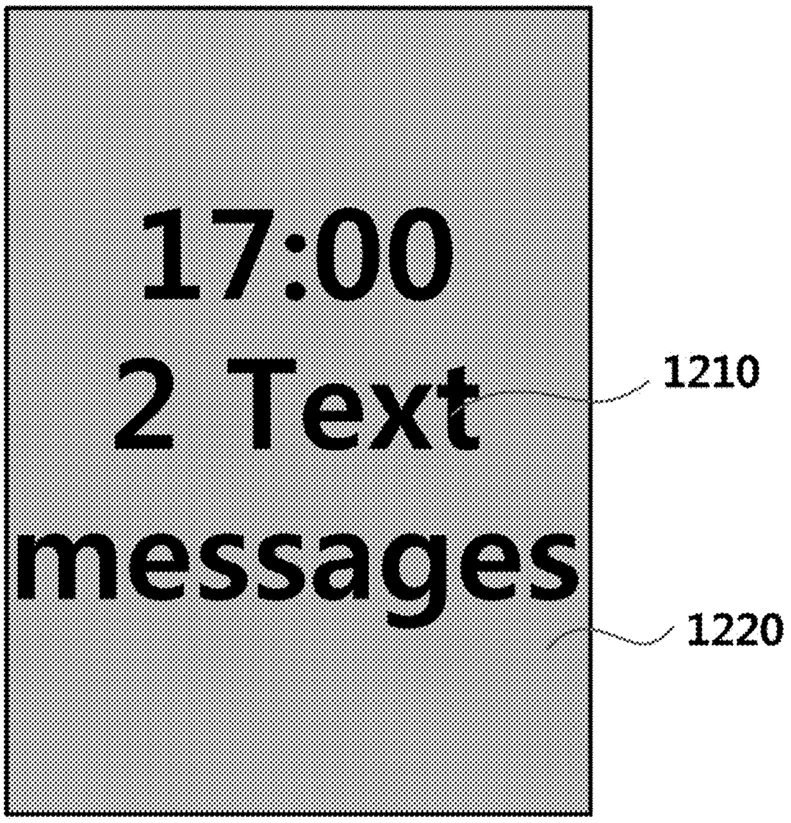
FIG. 12 illustrates an example of a screen design in another alternative embodiment of an image processing method according to the invention.

As illustrated in FIG. 12, a screen design having a text area 1210 processed to be dark and a background area 1220 processed to be suitable for an incandescent lamp environment is used in the incandescent lamp environment. In an embodiment, when an RGB color expression value of an image signal is converted to an HSL expression, the background area 1220 processed to be bright in a screen design for the incandescent lamp environment has an average lightness value of greater than or equal to a lightness threshold value and an average Hue value within a color threshold range based on a scarlet color value. A threshold value for determining a scarlet illumination ratio and a color threshold range of a background area for the incandescent lamp environment may have an initial value. In an embodiment, the threshold value and the color threshold range may be adjusted by the user of the computing device 100.

FIG. 13, FIG. 14, FIG. 15 and FIG. 16 illustrate various embodiments of a user interface for an image processing method, according to the invention.

Figure 13:
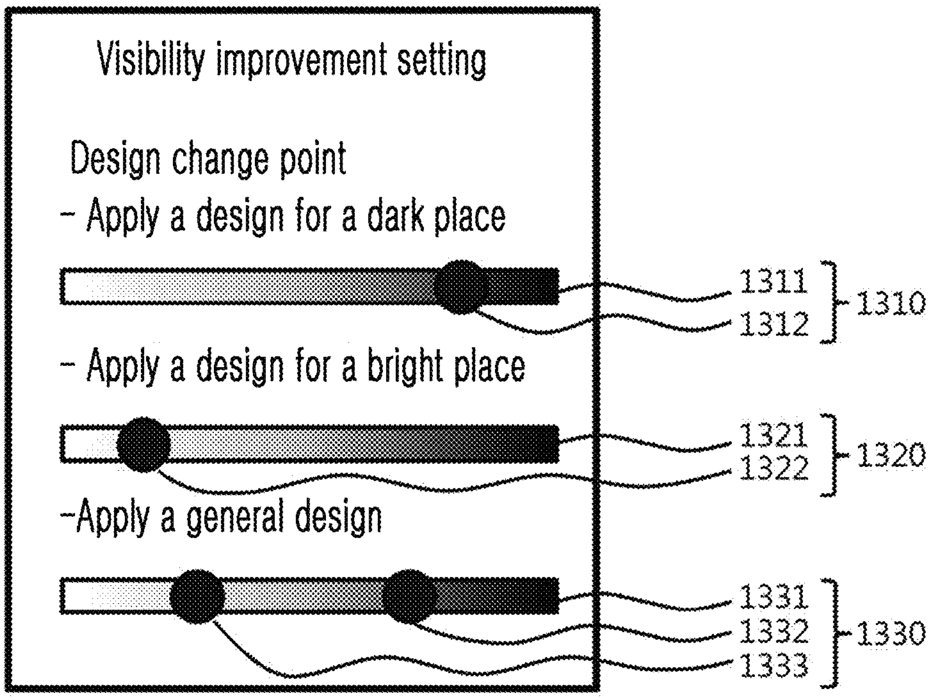
FIG. 13, FIG. 14, FIG. 15, and FIG. 16 illustrate various embodiments of a user interface for an image processing method, according to the invention.

In an embodiment, a user may select a threshold illumination value used to determine an external environment at the external environment determining module 210 of FIG. 2. In one embodiment, for example, when the user selects a visibility improvement setting option in a computing device, an interface for a visibility improvement setting is provided on the display 140 of FIG. 1 as illustrated in FIG. 13. Such an interface may be provided through a touch panel disposed on the display 140. In an embodiment, an interface 1310 for setting a first threshold illumination value used to apply a screen design for a dark environment, an interface 1320 for setting a second threshold illumination value used to apply a screen design for a bright environment, and an interface 1330 for setting a third threshold illumination value and a fourth threshold illumination value used to apply a screen design for a general illumination environment may be displayed on a set interface.

In one embodiment, for example, the user may set a desired threshold illumination value by moving a first threshold illumination value pointer 1312, a second threshold illumination value pointer 1322, and a third threshold illumination value pointer 1332 and a fourth threshold illumination value pointer 1333 on bar graphs 1311, 1321 and 1331 indicating various threshold illumination values in the respective interfaces 1310, 1320 and 1330, respectively.

Figure 14:
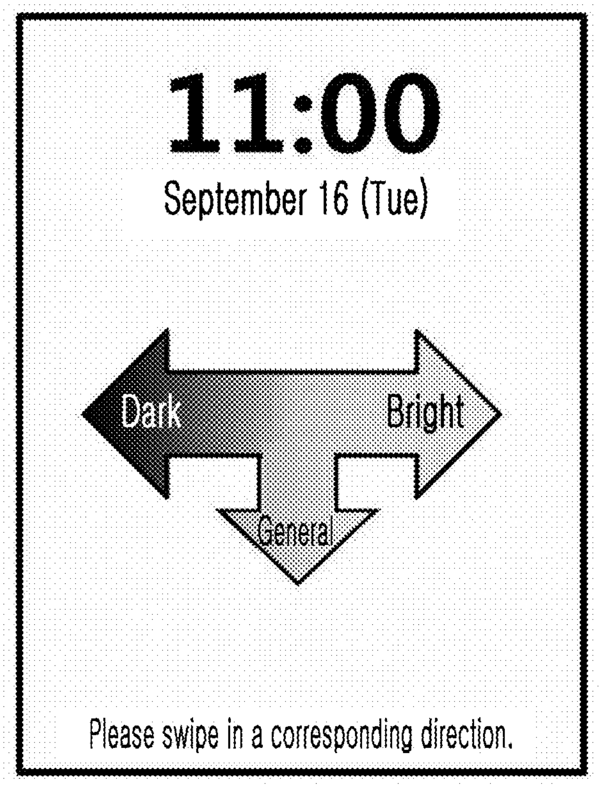

In an alternative embodiment, the user may arbitrarily select a screen design regardless of illumination of an external environment measured at the illumination sensor 170 of FIG. 1. In such an embodiment, the screen design setting module 220 of the computing device displays a screen for a screen design setting on the display 140. In one embodiment, for example, as illustrated in FIG. 14, a screen design may be selected along a sliding direction by a user touching a screen when unlocking a locked screen. In an embodiment, as shown in FIG. 14, when the user slides the screen to the right, a screen design for a bright environment is set. When the user slides the screen to the left, a screen design for a dark environment is set. When the user slides the screen downwards, a screen design for a general illumination environment is set. Accordingly, the set screen design is displayed on the display 140.

Figure 15:
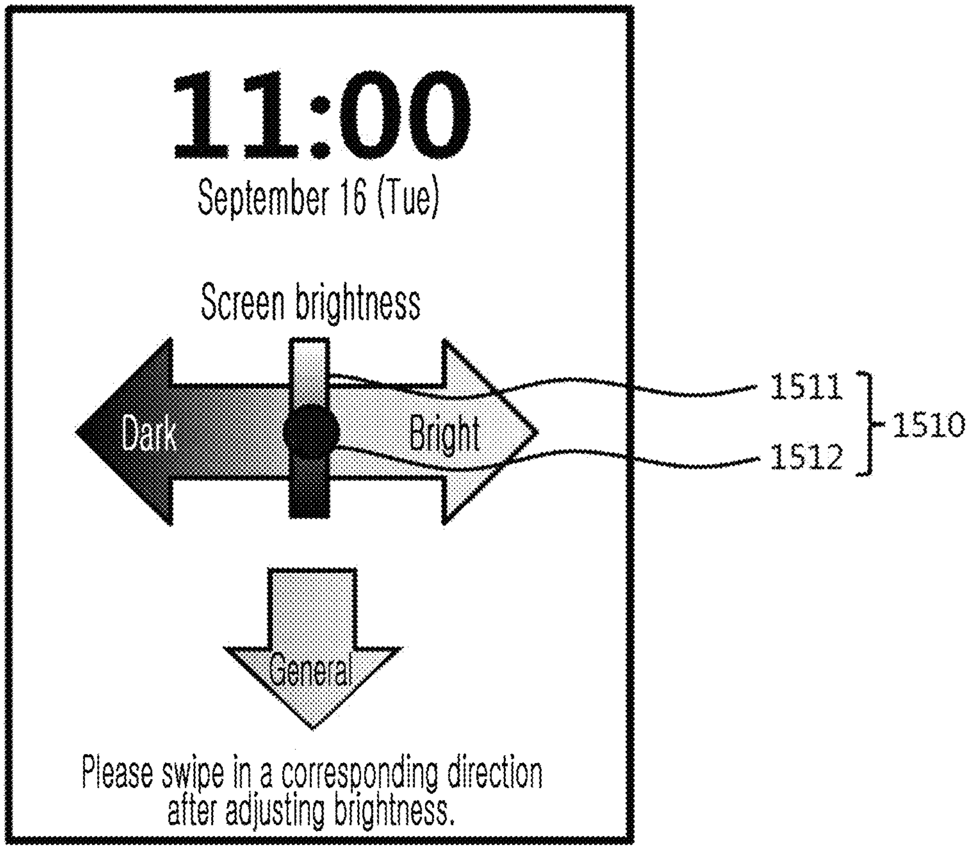

In another alternative embodiment, when selecting the screen design, the user may also select brightness (luminance) of the screen displayed on the display 140. In one embodiment, for example, as illustrated in FIG. 15, an interface 1510 for setting brightness of a screen on a locked screen capable of selecting a screen design may be displayed on the display 140. Then, the user may set a desired brightness of the screen by moving a pointer 1512 on a bar graph 1511 indicating various luminance values on the interface 1510.

Figure 16:
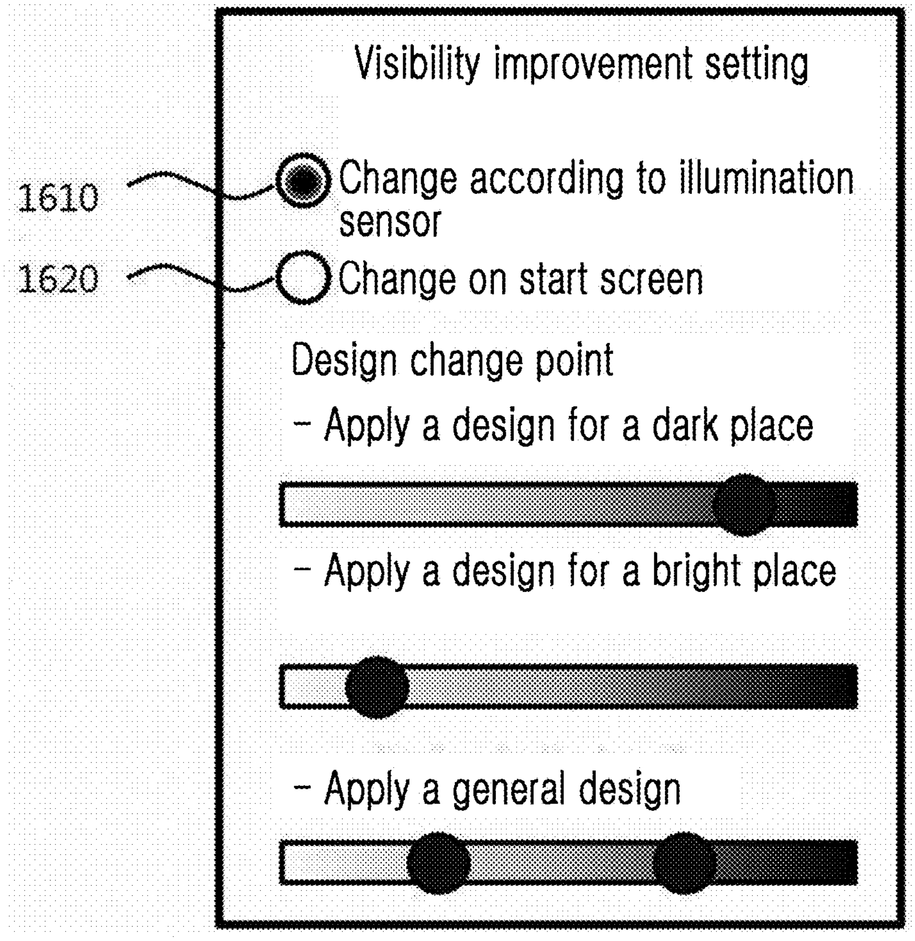

In still another alternative embodiment, a visibility improvement setting screen may include an option for setting a screen design based on an illumination sensor and an option that enables the user to select a screen design. In one embodiment, for example, as illustrated in FIG. 16, a change option 1610 according to an illumination sensor and a change 1620 on a locked screen may be displayed as options on the display 140. When the user selects only the change option 1610 according to the illumination sensor, an interface that enables the user to select the screen design on the locked screen is not provided and the screen design may be set based on illumination of an external environment measured at the illumination sensor. When the user selects only the change option 1620 on the locked screen, the screen design may be set in response to a selection of the user on the locked screen regardless of the illumination of the external environment measured at the illumination sensor. When the user selects both of the two change options 1610 and 1620, the screen design may be set in response to the selection of the user on the locked screen and then the screen design may be changed based on the illumination of the external environment measured at the illumination sensor.

Figure 17:
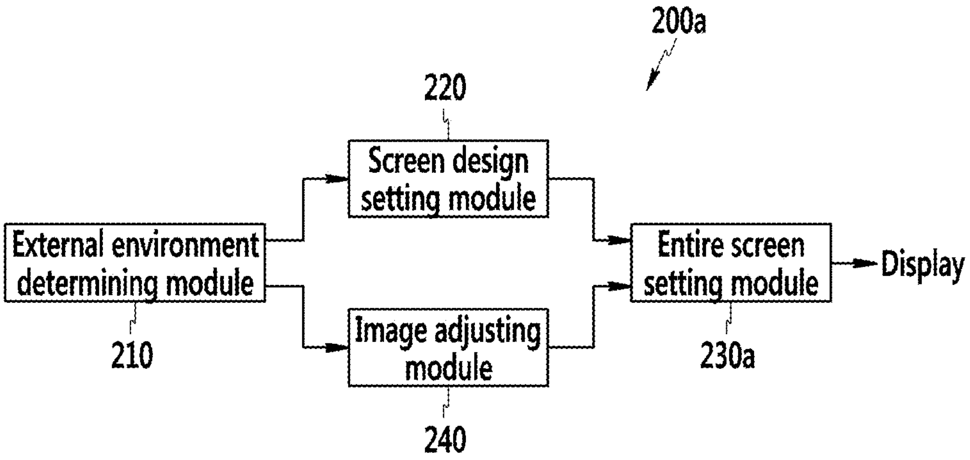
FIG. 17 is a block diagram of an embodiment of an image processing module according to the invention.

FIG. 17 is a block diagram of an alternative embodiment of an image processing module according to the invention.

Referring to FIG. 17, an embodiment of an image processing module 200*a* includes an external environment determining module 210, a screen design setting module 220, an entire screen setting module 230*a*, and an image adjusting module 240.

In such an embodiment, the image adjusting module 240 adjusts lightness and saturation of an image to be displayed on the display 140 of FIG. 1 based on an external environment determined at the external environment determining module 210. In such an embodiment, the lightness and the saturation of the image may be effectively adjusted based on the illumination using a variety of methods.

The entire screen setting module 230*a* combines the screen design set according to the external environment and the image adjusted at the image adjusting module 240.

While the invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A computing device comprising:

an illumination sensor which detects external illumination;

a processor which sets a screen design as a first screen design when a first condition is satisfied, and sets the screen design as a second screen design when a second condition is satisfied, wherein the first condition is satisfied when the external illumination is lower than a first threshold illumination value and when a stored illumination is higher than the first threshold illumination value, the stored illumination being external illumination which has been currently stored after being previously detected, and wherein the second condition is satisfied when the external illumination is higher than a second threshold illumination value, the second threshold illumination value being higher than the first threshold illumination value, and when the stored illumination is lower than the second threshold illumination value; and a display which displays an image on a screen thereof based on the set screen design.

2. The computing device of claim 1, wherein the processor sets the screen design as a third screen design when a third condition or a fourth condition is satisfied, wherein the third condition is satisfied when the external illumination is higher than a third threshold illumination value and lower than the second threshold illumination value and when the stored illumination is lower than the third threshold illumination value, and the fourth condition is satisfied when the external illumination is lower than a fourth threshold illumination value and higher than the first threshold illumination value and when the stored illumination is higher than the fourth threshold illumination value, the third threshold illumination value is higher than the first threshold illumination value, the fourth threshold illumination value is higher than the third threshold illumination value, and the second threshold illumination value is higher than the fourth threshold illumination value.

3. The computing device of claim 2, wherein the processor maintains the screen design as it is when the external illumination and the stored illumination do not satisfy the first condition, the second condition, the third condition and the fourth condition.

4. The computing device of claim 1, wherein the processor stores the external illumination as the stored illumination and detects the external illumination again through the illumination sensor after a predetermined period of time has elapsed.

5. The computing device of claim 1, wherein the second screen design comprises a third screen design and a fourth screen design, the processor sets the screen design as the third screen design when the external illumination and the stored illumination satisfy the second condition and when a ratio of a scarlet illumination to an entire illumination in the external illumination is greater than or equal to a threshold value, and the processor sets the screen design as the fourth screen design when the external illumination and the stored illumination satisfy the second condition and when the ratio of the scarlet illumination to the entire illumination in the external illumination is less than the threshold value.

6. The computing device of claim 1, wherein each of the first screen design and the second screen design comprises a text area and a background area, the text area comprises a text to be displayed on the display and the background area comprises a background to be displayed on the display, and the background area of the first screen design is darker than the background area of the second screen design.

7. The computing device of claim 6, wherein an average lightness value of the background area of the first screen design is less than an average lightness value of the background area of the second screen design.

8. The computing device of claim 7, wherein the average lightness value of the background area of the first screen design is less than 50%, and the average lightness value of the background area of the second screen design is greater than or equal to 50%.

9. The computing device of claim 7, wherein the text area of the first screen design is brighter than the background area of the first screen design, and the text area of the second screen design is darker than the background area of the second screen design.

10. The computing device of claim 9, wherein an average lightness value of the text area of the first screen design is greater than an average lightness value of the background area of the first screen design, and an average lightness value of the text area of the second screen design is less than an average lightness value of the background area of the second screen design.

11. The computing device of claim 1, further comprising:

an input device which provides an interface of adjusting a plurality of threshold illumination values comprising the first threshold illumination value and the second threshold illumination value.

12. The computing device of claim 1, further comprising:

an input device which provides an interface for selecting a single screen design from a plurality of screen designs comprising the first screen design and the second screen design, independently of the external illumination.

13. An image processing method of a computing device comprising a display, the method comprising:

detecting external illumination;

setting a screen design as a first screen design when the external illumination is lower than a first threshold illumination value and when a stored illumination is higher than the first threshold illumination value, the stored illumination being external illumination which has been currently stored after being previously detected, and setting the screen design as a second screen design when the external illumination is higher than a second threshold illumination value, the second threshold illumination value being higher than the first threshold illumination value, and when the stored illumination is lower than the second threshold illumination value; and displaying an image on a screen of the display based on the set screen design.

14. The method of claim 13, wherein setting the screen design comprises setting the screen design as a third screen design, when the external illumination is higher than a third threshold illumination value and lower than the second threshold illumination value and when the stored illumination is lower than the third threshold illumination value, or when the external illumination is lower than a fourth threshold illumination value and higher than the first threshold illumination value and when the stored illumination is higher than the fourth threshold illumination value.

15. The method of claim 13, further comprising:

storing the external illumination as the stored illumination; and repeating the detecting the external illumination, the setting the external illumination and the displaying the screen at predetermined time intervals.

16. The method of claim 13, wherein each of the first screen design and the second screen design comprises a text area and a background area, the text area comprises a text to be displayed on the display and the background area comprises a background to be displayed on the display, and the background area of the first screen design is darker than the background area of the second screen design.

17. The method of claim 13, wherein the text area of the first screen design is brighter than the background area of the first screen design, and the text area of the second screen design is darker than the background area of the second screen design.

18. The method of claim 13, further comprising:

providing an interface of adjusting a plurality of threshold illumination values comprising the first threshold illumination value and the second threshold illumination value; and receiving an adjusted value of a threshold illumination value of the plurality of threshold illumination values through the interface.

19. The method of claim 13, further comprising:

providing an interface for selecting a plurality of screen designs comprising the first screen design and the second screen design; and receiving a selection on any one of the plurality of screen designs through the interface.

20. A non-transitory computer-readable storage medium storing instructions to implement an image processing method on a processor of a computing device comprising a display, the method comprising:

detecting an external illumination;

setting a screen design as a first screen design when the external illumination is lower than a first threshold illumination value and a stored illumination is higher than the first threshold illumination value, the stored illumination being external illumination which has been currently stored after being previously detected, and setting the screen design as a second screen design when the external illumination is higher than a second threshold illumination value, the second threshold illumination value being higher than the first threshold illumination value, and when the stored illumination is lower than the second threshold illumination value; and displaying a screen image, on which the set screen design and an image are combined, on a display.

* * * * *